(12) United States Patent
Kanaya et al.

(10) Patent No.: US 10,753,658 B2
(45) Date of Patent: Aug. 25, 2020

(54) AIR-CONDITIONING APPARATUS

(71) Applicant: Mitsubishi Electric Corporation, Tokyo (JP)

(72) Inventors: Osamu Kanaya, Tokyo (JP); Masanori Aoki, Tokyo (JP); Mizuo Sakai, Tokyo (JP); Yasuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/523,013

(22) PCT Filed: Jan. 23, 2015

(86) PCT No.: PCT/JP2015/051838
§ 371 (c)(1),
(2) Date: Apr. 28, 2017

(87) PCT Pub. No.: WO2016/117113
PCT Pub. Date: Jul. 28, 2016

(65) Prior Publication Data
US 2017/0336115 A1 Nov. 23, 2017

(51) Int. Cl.
*F25B 47/02* (2006.01)
*F25B 49/02* (2006.01)
(Continued)

(52) U.S. Cl.
CPC ............ *F25B 47/025* (2013.01); *F24F 11/41* (2018.01); *F24F 11/89* (2018.01); *F25B 49/02* (2013.01);
(Continued)

(58) Field of Classification Search
CPC ... F24F 11/41; F24F 11/42; F25B 2341/0662; F25B 41/062; F25B 2600/2513; F25B 47/025; F25B 2347/02; F25B 2400/051
See application file for complete search history.

(56) References Cited

U.S. PATENT DOCUMENTS

| 5,285,646 A | 2/1994 | TaeDuk |
| 2009/0158764 A1* | 6/2009 | Kim ..................... F25B 49/02 62/225 |

FOREIGN PATENT DOCUMENTS

| EP | 2 918 953 A1 | 9/2015 |
| EP | 2918953 A1 | 9/2015 |

(Continued)

OTHER PUBLICATIONS

International Search Report of the International Searching Authority dated Apr. 28, 2015 for the corresponding international application No. PCT/JP2015/051838 (and English translation).

(Continued)

*Primary Examiner* — Tavia Sullens
(74) *Attorney, Agent, or Firm* — Posz Law Group, PLC

(57) ABSTRACT

A control unit is configured to set a rotation speed of a compressor to be lower than that in a defrosting operation and set an opening degree of a pressure reducing device to be equal to or greater than that in the defrosting operation during a first control time after completion of the defrosting operation, stop the compressor and set the opening degree of the pressure reducing device to be less than that in the first control time during a second control time after lapse of the first control time, and control a refrigerant circuit switching device to resume a heating operation after lapse of the second control time.

8 Claims, 4 Drawing Sheets

(51) Int. Cl.
*F24F 11/41* (2018.01)
*F24F 11/89* (2018.01)

(52) U.S. Cl.
CPC . *F25B 2341/0662* (2013.01); *F25B 2400/053* (2013.01); *F25B 2400/054* (2013.01); *F25B 2500/12* (2013.01); *F25B 2600/0253* (2013.01); *F25B 2600/2513* (2013.01); *Y02B 30/741* (2013.01)

(56) References Cited

FOREIGN PATENT DOCUMENTS

| | | |
|---|---|---|
| JP | 05-346256 A | 12/1993 |
| JP | 10-246525 A | 9/1998 |
| JP | 2000-274782 A | 10/2000 |
| JP | 2003-240391 A | 8/2003 |
| JP | 2003-287319 A | 10/2003 |
| JP | 2004-233015 A | 8/2004 |
| JP | 2009-236346 A | 10/2009 |
| JP | 5516695 B2 | 4/2014 |
| JP | 2014-089004 A | 5/2014 |
| JP | 2014-129957 A | 7/2014 |
| WO | 2014/068833 A1 | 5/2014 |
| WO | WO 2014068833 A1 * | 5/2014 ............ F25B 47/025 |

OTHER PUBLICATIONS

Extended European Search Report dated Feb. 8, 2017 for the corresponding European Patent Application No. 15 87 4420.1.
Office Action dated Dec. 22, 2015 for the corresponding Japanese Patent Application No. 2015-535930 (and English translation).
Office Action dated May 10, 2016 for the corresponding Japanese Patent Application No. 2015-535930 (and English translation).
Office Action dated Apr. 18, 2017 for the corresponding Japanese Patent Application No. 2016-156737 (and English translation).
Office Action dated Mar. 1, 2019 issued in corresponding CN patent application No. 201580073429.6 (and English translation).

* cited by examiner

AIR-CONDITIONING APPARATUS

CROSS REFERENCE TO RELATED APPLICATION

This application is a U.S. national stage application of PCT/JP2015/051838 filed on Jan. 23, 2015, the contents of which are incorporated herein by reference.

TECHNICAL FIELD

The present invention relates to an air-conditioning apparatus.

BACKGROUND ART

A conventional air-conditioning apparatus performs a defrosting operation every time the air-conditioning apparatus performs a heating operation for a predetermined time to melt frost adhering to an outdoor heat exchanger to control deterioration of heat exchange capacity (see Patent Literature 1, for example).

CITATION LIST

Patent Literature

Patent Literature 1: Japanese Patent No. 5516695

SUMMARY OF INVENTION

Technical Problem

During the time from the completion of the defrosting operation to the resumption of the heating operation, the conventional air-conditioning apparatus sets the rotation speed of a compressor to be lower than that in the defrosting operation and sets the opening degree of a pressure reducing device to be less than that in the defrosting operation at the completion of the defrosting operation. Thus, the pressure difference between an outdoor heat exchanger side and an indoor heat exchanger side of the pressure reducing device is hardly reduced. This relatively large pressure difference causes a relatively large amount of refrigerant to move in the pressure reducing device, resulting in a problem of the occurrence of refrigerant sound from the pressure reducing device at the completion of the defrosting operation.

Further, after the above-described operation, the compressor is stopped, and the opening degree of the pressure reducing device is further reduced. Thus, the above-described pressure difference is not eliminated even at the resumption of the heating operation, raising a problem that an excessive load is imposed on a shaft bearing of the compressor at the start of the compressor, creating a possibility of malfunction of the compressor.

The present invention has been made to solve the problems as described above and aims to provide an air-conditioning apparatus in which the occurrence of the refrigerant sound at the completion of the defrosting operation is controlled and the malfunction of the compressor possibly occurring at the resumption of the heating operation is controlled.

Solution to Problem

An air-conditioning apparatus according to the present invention includes a refrigerant circuit connecting a compressor, a refrigerant circuit switching device, an outdoor heat exchanger, a pressure reducing device, and an indoor heat exchanger, and performing a refrigeration cycle in which refrigerant circulates, and a control unit configured to control the refrigerant circuit switching device to cause refrigerant to flow from the compressor into the indoor heat exchanger in a heating operation, and cause refrigerant to flow from the compressor into the outdoor heat exchanger in a defrosting operation of defrosting the outdoor heat exchanger. The control unit is configured to set a rotation speed of the compressor to be lower than that in the defrosting operation and set an opening degree of the pressure reducing device to be equal to or greater than that in the defrosting operation during a first control time after completion of the defrosting operation, stop the compressor and set the opening degree of the pressure reducing device to be less than that in the first control time during a second control time after lapse of the first control time, and control the refrigerant circuit switching device to resume the heating operation after lapse of the second control time.

Advantageous Effects of Invention

According to the present invention, during the first control time after the completion of the defrosting operation, the rotation speed of the compressor is set to be lower than that in the defrosting operation, and the opening degree of the pressure reducing device is set to be equal to or greater than that in the defrosting operation. Further, during the second control time after the lapse of the first control time, the compressor is stopped, and the opening degree of the pressure reducing device is set to be less than that in the first control time.

This operation in the first control time can substantially reduce the pressure difference between the outdoor heat exchanger side and the indoor heat exchanger side of the pressure reducing device, as compared with the conventional art. It is therefore possible to control the occurrence of the refrigerant sound from the pressure reducing device at the completion of the defrosting operation. Further, since it is possible to substantially reduce the above-described pressure difference during the first control time, it is possible to reliably eliminate the pressure difference at the resumption of the heating operation, thus controlling the malfunction of the compressor at the resumption of the heating operation.

DESCRIPTION OF EMBODIMENTS

Embodiment 1 and Embodiment 2 of an air-conditioning apparatus according to the present invention will be described in detail below with the drawings.

Embodiment 1

Figure 1:
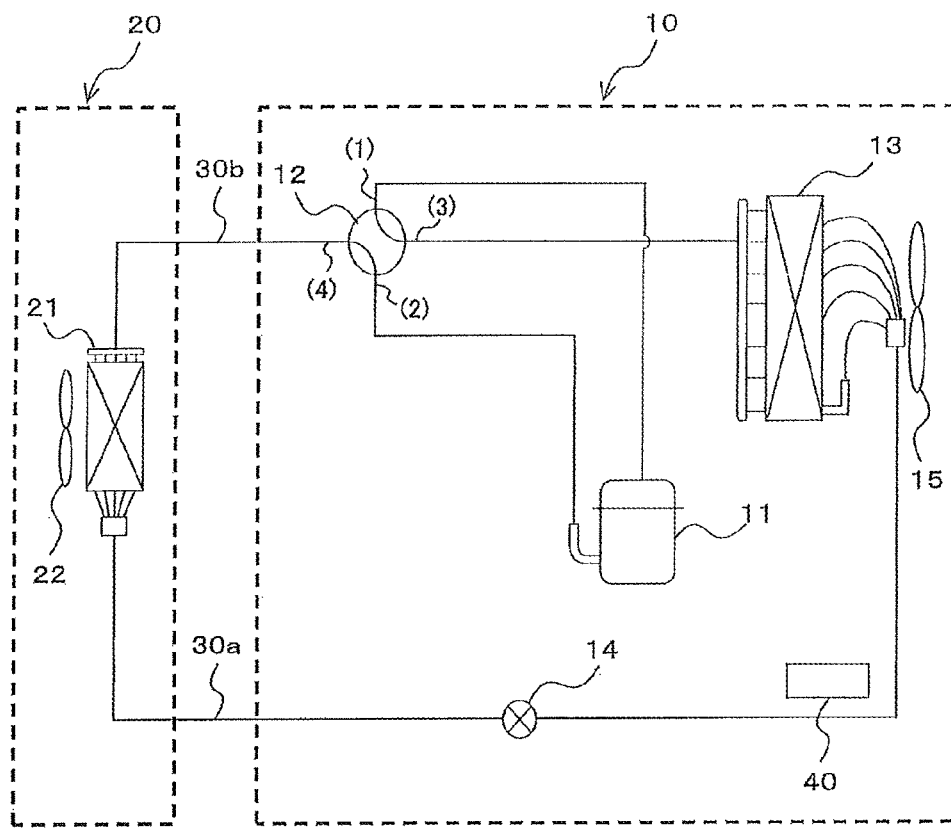
FIG. 1 is a refrigerant circuit diagram illustrating a schematic configuration of an air-conditioning apparatus in Embodiment 1 of the present invention.

FIG. 1 is a refrigerant circuit diagram illustrating a schematic configuration of an air-conditioning apparatus in Embodiment 1 of the present invention. The air-conditioning apparatus in Embodiment 1 is formed of an outdoor unit 10, an indoor unit 20, and extension pipes 30a and 30b on a liquid side and a gas side connecting the outdoor unit 10 and the indoor unit 20 to each other. The outdoor unit 10 includes a compressor 11, a refrigerant circuit switching device 12, an outdoor heat exchanger 13, a pressure reducing device 14, an outdoor fan 15, and other devices. The indoor unit 20 includes an indoor heat exchanger 21, an indoor fan 22, and other devices.

Further, a refrigerant circuit is formed that sequentially and circularly connects the compressor 11, the refrigerant circuit switching device 12, the outdoor heat exchanger 13, the pressure reducing device 14, and the indoor heat exchanger 21, and is filled with refrigerant R32. The compressor 11 in this refrigerant circuit has a discharge side connected to a first connection end (1) of the refrigerant circuit switching device 12 and a suction side connected to a second connection end (2) of the refrigerant circuit switching device 12. Further, between a third connection end (3) and a fourth connection end (4) of the refrigerant circuit switching device 12, the outdoor heat exchanger 13, the pressure reducing device 14, and the indoor heat exchanger 21 are connected from the side of the third connection end (3).

A scroll or rotary, fully hermetic compressor, for example, is employed as the compressor 11. An electric motor of the compressor 11 is connected to a commercial power supply via an inverter. When the output frequency of the inverter is changed, the rotation speed of the electric motor changes, and the rotation speed of the compressor 11 changes accordingly.

The refrigerant circuit switching device 12 switches the circulation direction of the refrigerant in the refrigerant circuit to switch the operation of the air-conditioning apparatus (one of a cooling operation, a heating operation, and a defrosting operation). In the cooling operation or the defrosting operation, this refrigerant circuit switching device 12 is brought into a first switching state in which the first connection end (1) communicates with the third connection end (3), and the second connection end (2) and the fourth connection end (4) communicate with each other. Further, in the heating operation, the refrigerant circuit switching device 12 is brought into a second switching state in which the first connection end (1) and the fourth connection end (4) communicate with each other, and the second connection end (2) communicates with the third connection end (3).

Cross-fin heat exchangers, for example, are employed as the outdoor heat exchanger 13 and the indoor heat exchanger 21. The outdoor heat exchanger 13 exchanges heat of the refrigerant with outdoor air, and the indoor heat exchanger 21 exchanges heat of the refrigerant with indoor air. The pressure reducing device 14 is an electronic expansion valve, for example, and is configured to be changed in opening degree by a pulse motor. A controller 40 mounted in the outdoor unit 10 controls the operations of devices of the refrigerant circuit, such as the rotation speed of the compressor 11, the opening degree of the pressure reducing device 14, and the switching of the refrigerant circuit switching device 12. The controller 40 is not limited to be mounted in the outdoor unit 10, and may be mounted in the indoor unit 20, or may be mounted in both the outdoor unit 10 and the indoor unit 20 to allow communication with each other.

Further, during a first control time (30 seconds, for example) after the completion of the defrosting operation, this controller 40 sets the rotation speed of the compressor 11 to be lower than that in the defrosting operation and maintains the opening degree of the pressure reducing device 14, when the opening degree of the pressure reducing device 14 in the defrosting operation is fully open. Further, when the opening degree of the pressure reducing device 14 in the defrosting operation is not fully open, the controller 40 increases the opening degree of the pressure reducing device 14 (to fully open, for example). Then, during a second control time (30 seconds, for example) equal in length to the first control time, for example, after the lapse of the first control time, the controller 40 stops the compressor 11, and sets the opening degree of the pressure reducing device 14 to be less than that in the first control time. After the lapse of the second control time, the controller 40 switches the refrigerant circuit switching device 12 to the second switching state to resume the heating operation.

A description will be given here of an operation of the air-conditioning apparatus configured as described above.

In the cooling operation, the controller 40 brings the refrigerant circuit switching device 12 into the first switching state and adjusts the opening degree of the pressure reducing device 14 so that the degree of subcooling of the refrigerant flowing out of the outdoor heat exchanger 13 reaches a target value. The controller 40 further performs the operations of the outdoor fan 15 and the indoor fan 22.

When the compressor 11 is driven by the controller 40 in this state, high-temperature gas refrigerant is discharged from the compressor 11. This gas refrigerant flows into the outdoor heat exchanger 13 via the refrigerant circuit switching device 12, turns into liquid refrigerant through heat exchange with outdoor air, and flows out of the outdoor heat exchanger 13. The liquid refrigerant then turns into two-phase gas-liquid refrigerant through pressure reduction performed in the pressure reducing device 14 and thereafter flows into the indoor heat exchanger 21. The two-phase gas-liquid refrigerant flowing into the indoor heat exchanger 21 evaporates through heat exchange with indoor air. In this process, the indoor air suctioned by the indoor fan 22 is cooled. Gas refrigerant evaporated in the indoor heat exchanger 21 is suctioned into the compressor 11 via the refrigerant circuit switching device 12. This suctioned gas refrigerant is compressed and discharged again by the compressor 11, and the refrigerant is repeatedly circulated.

In the heating operation, the controller 40 brings the refrigerant circuit switching device 12 into the second switching state and adjusts the opening degree of the pressure reducing device 14 so that the degree of subcooling of the refrigerant flowing out of the indoor heat exchanger 21 reaches a target value. The controller 40 further performs the operations of the outdoor fan 15 and the indoor fan 22.

When the compressor 11 is driven by the controller 40 in this state, high-temperature gas refrigerant is discharged from the compressor 11. This gas refrigerant flows into the indoor heat exchanger 21 via the refrigerant circuit switching device 12 and turns into liquid refrigerant through heat exchange with indoor air. In this process, the indoor air suctioned by the indoor fan 22 is heated. The liquid refrigerant turns into two-phase gas-liquid refrigerant through pressure reduction performed in the pressure reducing device 14, and thereafter flows into the outdoor heat exchanger 13. The two-phase gas-liquid refrigerant flowing into the outdoor heat exchanger 13 turns into gas refrigerant through heat exchange with outdoor air and flows out of the outdoor heat exchanger 13. The gas refrigerant flowing out of the outdoor heat exchanger 13 is then suctioned into the compressor 11 via the refrigerant circuit switching device 12. This suctioned gas refrigerant is compressed and discharged again by the compressor 11, and the refrigerant is repeatedly circulated.

The controller 40 switches the refrigerant circuit switching device 12 from the second switching state to the first switching state during the heating operation, and controls the pressure reducing device 14 in the defrosting operation so that the opening degree of the pressure reducing device 14 reaches a preset opening degree for the defrosting operation (fully open, for example). Further, the controller 40 stops the operations of the outdoor fan 15 and the indoor fan 22.

When the compressor 11 is driven by the controller 40 in this state, high-temperature gas refrigerant is discharged from the compressor 11. Similarly, as in the cooling operation, this gas refrigerant flows into the outdoor heat exchanger 13 via the refrigerant circuit switching device 12 and turns into liquid refrigerant through heat exchange with frost adhering to the outdoor heat exchanger 13. In this process, the frost is heated and melted by the high-temperature gas refrigerant. The liquid refrigerant then turns into two-phase gas-liquid refrigerant through pressure reduction performed in the pressure reducing device 14, and thereafter flows into the indoor heat exchanger 21. The refrigerant flowing into the indoor heat exchanger 21 is suctioned into the compressor 11 via the refrigerant circuit switching device 12. This suctioned refrigerant is compressed and discharged again by the compressor 11, and the refrigerant is repeatedly circulated. This defrosting operation continues to be performed until a predetermined condition for the completion of defrosting is satisfied. For example, a defrosting operation time corresponding to the outdoor air temperature is previously set in the controller 40 as the condition for the completion of defrosting. Then, when the controller 40 starts the defrosting operation, the controller 40 selects the defrosting operation time based on the temperature detected by a temperature detection unit (not illustrated) installed in the outdoor unit 10 (outdoor air temperature) and performs the defrosting operation until the defrosting operation time elapses. Alternatively, a temperature condition of the outdoor heat exchanger 13 (plus 3 degrees Celsius, at which frost is reliably melted, for example) is previously set in the controller 40 as the condition for the completion of defrosting. Then, after the start of the defrosting operation, the controller 40 performs the defrosting operation until the temperature detected by the temperature detection unit (not illustrated) installed in the outdoor heat exchanger 13 in the outdoor unit 10 (outdoor heat exchanger temperature) reaches the above-described preset temperature condition (plus 3 degrees Celsius in this case).

Figure 2:
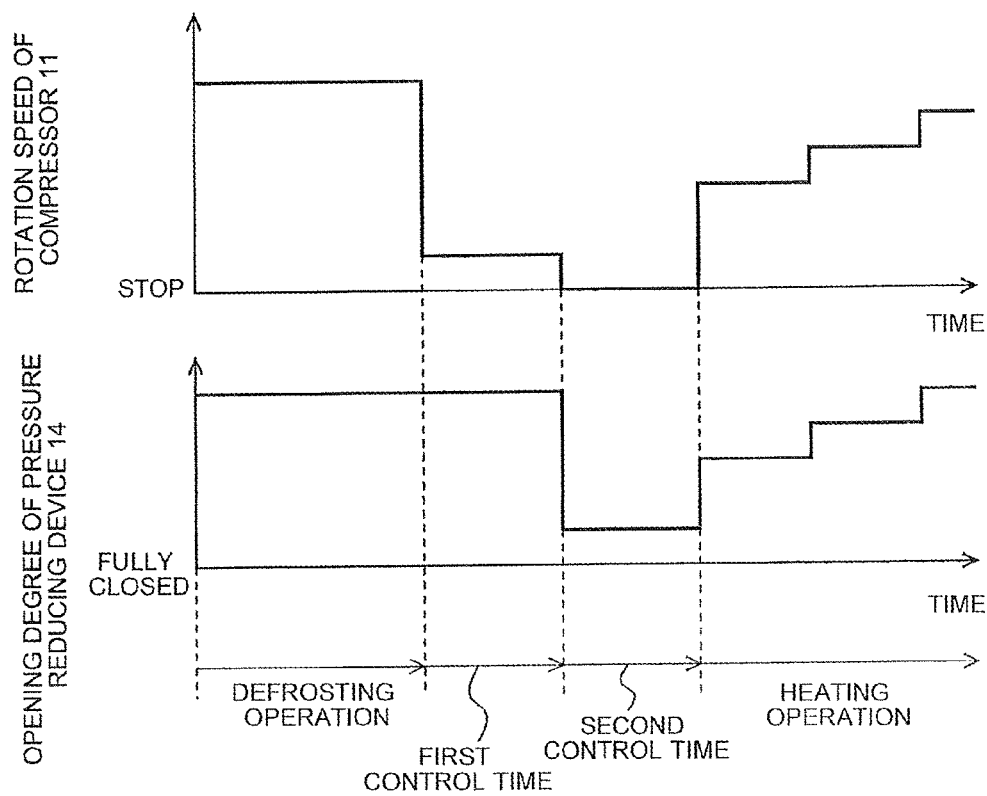
FIG. 2 is a time chart illustrating the rotation speed of a compressor and the opening degree of a pressure reducing device after a defrosting operation in Embodiment 1 of the present invention.
Figure 3:
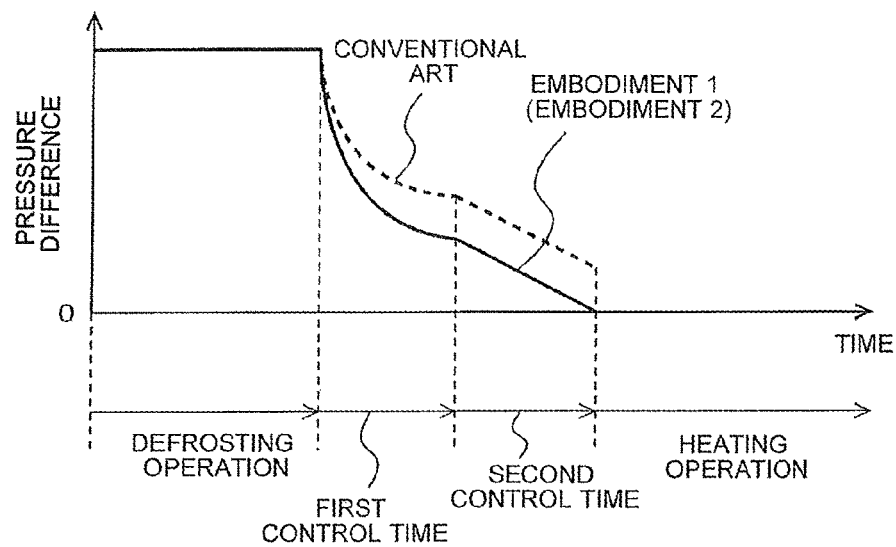
FIG. 3 is a diagram illustrating a change in a pressure difference between an outdoor heat exchanger side and an indoor heat exchanger side in Embodiment 1 of the present invention, as compared with that in a conventional art.

An operation performed during the time from the completion of the defrosting operation to the resumption of the heating operation will be described below with FIG. 2 and FIG. 3. FIG. 2 is a time chart illustrating the rotation speed of the compressor and the opening degree of the pressure reducing device after the defrosting operation in Embodiment 1 of the present invention. FIG. 3 is a diagram illustrating a change in a pressure difference between an outdoor heat exchanger side and an indoor heat exchanger side in Embodiment 1 of the present invention, as compared with that in a conventional art. FIG. 2 and FIG. 3 illustrate examples, which are not exhaustive.

During the first control time after the completion of the defrosting operation, the controller 40 drives the compressor 11 with the rotation speed lower than that in the defrosting operation and maintains the opening degree of the pressure reducing device 14 to be equal to that in the defrosting operation (fully open, for example). The controller 40 further maintains the first switching state of the refrigerant circuit switching device 12 and keeps the outdoor fan 15 and the indoor fan 22 stopped.

Although the opening degree of the pressure reducing device 14 in the first control time is described to be maintained to be equal to that in the defrosting operation, the opening degree of the pressure reducing device 14 is increased (to fully open, for example) when the opening degree of the pressure reducing device 14 in the defrosting operation is not fully open.

In the refrigerant circuit in this process, the refrigerant circulates in the same direction as that in the defrosting operation. The refrigeration cycle is performed also in this case in which the outdoor heat exchanger 13 acts as a condenser and the indoor heat exchanger 21 acts as an evaporator. Further, the pressure difference between the outdoor heat exchanger 13 side and the indoor heat exchanger 21 side connected to the pressure reducing device 14 is substantially reduced as compared with that in the defrosting operation, as illustrated in FIG. 3, because the opening degree of the pressure reducing device 14 is maintained at that in the defrosting operation or set to be greater than that in the defrosting operation while the rotation speed of the compressor 11 is reduced.

Meanwhile, according to the aforementioned conventional art, the compressor 11 is driven with the rotation speed lower than that in the defrosting operation, and the opening degree of the pressure reducing device 14 is set to be less than that in the defrosting operation. The above-described pressure difference is thus smaller than that in the defrosting operation but is not smaller than that in Embodiment 1 described above due to the reduction in the opening degree of the pressure reducing device 14, and a relatively large pressure difference is maintained. The conventional art therefore is unable to control the occurrence of the refrigerant sound accompanying the movement of the refrigerant due to the pressure difference.

During the second control time after the lapse of the first control time, the controller 40 stops the compressor 11, and sets the opening degree of the pressure reducing device 14 to be less than that in the first control time (a minimum opening degree, for example). Further, the controller 40 maintains the first switching state of the refrigerant circuit switching device 12 and keeps the outdoor fan 15 and the indoor fan 22 stopped.

The compressor 11 in the refrigerant circuit is stopped in this process, and thus the refrigeration cycle is not performed, and the refrigerant does not circulate from the outdoor heat exchanger 13 side to the indoor heat exchanger 21 side via the pressure reducing device 14. A part of the refrigerant in the outdoor heat exchanger 13 flows into the indoor heat exchanger 21 through the pressure reducing device 14 to eliminate the pressure difference between the outdoor heat exchanger 13 side and the indoor heat exchanger 21 side connected to the pressure reducing device 14. In this case, the above-described pressure difference is smaller than that in the conventional art, as illustrated in FIG. 3, and the opening degree of the pressure reducing device 14 is further reduced. Therefore, the flow of the liquid refrigerant from the outdoor heat exchanger 13 to the indoor heat exchanger 21 is reduced to a minimum amount, and the above-described pressure difference is reliably eliminated (the pressure difference is zero) at the end of the second control time, that is, at the resumption of the heating operation.

Although the length of the second control time has been set to be equal to that of the first control time, when the first control time is set to be sufficiently long (45 seconds, for example), the drop of the pressure difference in the first control time further increases, enabling the second control time to be shorter than the first control time. Also, in this case, the pressure difference can be reliably eliminated. Alternatively, the second control time may be set to be longer than the first control time. In this case, the pressure difference can be more reliably eliminated.

After the lapse of the second control time, the controller 40 switches the refrigerant circuit switching device 12 from the first switching state to the second switching state to resume the heating operation. When the controller 40 resumes the heating operation, the controller 40 starts and controls the compressor 11 to increase the rotation speed of the compressor 11 in steps, and controls the pressure reducing device 14 to increase the opening degree of the pressure reducing device 14 in steps to a predetermined opening degree. Since the above-described pressure difference has been eliminated at the start of this compressor 11, no excessive load is imposed on the shaft bearing of the compressor 11, leaving no possibility of malfunction of the compressor 11.

As described above, according to Embodiment 1, in the first control time during the time from the completion of the defrosting operation to the resumption of the heating operation, the opening degree of the pressure reducing device 14 is maintained to be equal to that in the defrosting operation, or is set to be greater than that in the defrosting operation, when the rotation speed of the compressor 11 is to be reduced. It is thereby possible to substantially reduce the pressure difference to thus control the occurrence of the refrigerant sound.

Further, in the first control time, the opening degree of the pressure reducing device 14 is maintained to be equal to that in the defrosting operation or is set to be greater than that in the defrosting operation, as described above. Further, in the second control time, the opening degree of the pressure reducing device 14 is set to be less than that in the first control time when the compressor 1 is stopped. Thereby, the pressure difference is eliminated at the end of the second control time, that is, at the resumption of the heating operation, and thus no excessive load is imposed on the shaft bearing of the compressor 11, leaving no possibility of malfunction of the compressor 11.

As described above, the present invention is useful for an air-conditioning apparatus that performs a heating operation of heating the interior of a room and a defrosting operation of defrosting the outdoor heat exchanger 13.

Embodiment 2

Although the rotation speed of the compressor 11 and the opening degree of the pressure reducing device 14 are controlled in Embodiment 1 to control the occurrence of the refrigerant sound and the malfunction of the compressor, the rotation speed of the compressor 11 and the opening degrees of two pressure reducing devices 14a, 14b are controlled in Embodiment 2 to control the occurrence of the refrigerant sound and the malfunction of the compressor.

Figure 4:
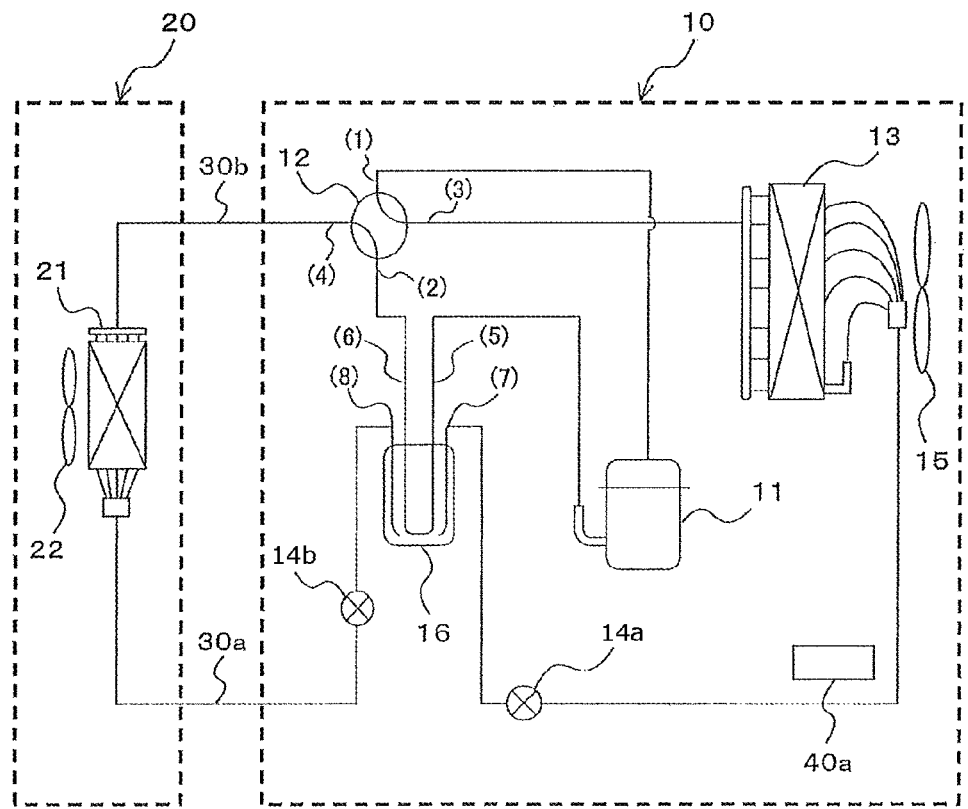
FIG. 4 is a refrigerant circuit diagram illustrating a schematic configuration of an air-conditioning apparatus in Embodiment 2 of the present invention.

FIG. 4 is a refrigerant circuit diagram illustrating a schematic configuration of an air-conditioning apparatus in Embodiment 2 of the present invention. Parts that are the same as those in Embodiment 1 are assigned with the same reference signs. Further, description of the parts that are the same as those in Embodiment 1 will be omitted.

As illustrated in FIG. 4, the air-conditioning apparatus in Embodiment 2 includes the outdoor unit 10 having a container 16, an outdoor-side pressure reducing device 14a (a first pressure-reducing device), and an indoor-side pressure reducing device 14b (a second pressure reducing device) added between the container 16 and the indoor heat exchanger 21. In the refrigerant circuit of this air-conditioning apparatus, the discharge side of the compressor 11 is connected to the first connection end (1) of the refrigerant circuit switching device 12, and the suction side of the compressor 11 is connected to the second connection end (2) of the refrigerant circuit switching device 12 via a fifth connection end (5) to a sixth connection end (6) of the container 16. Further, between the third connection end (3) and the fourth connection end (4) of the refrigerant circuit switching device 12, the outdoor heat exchanger 13, the outdoor-side pressure reducing device 14a, the container 16, the indoor-side pressure reducing device 14b, and the indoor heat exchanger 21 are sequentially connected from the side of the third connection end (3).

The indoor-side pressure reducing device 14b is an electronic expansion valve similar to the outdoor side pressure reducing device 14a and is configured to be changed in opening degree by a pulse motor. A controller 40a controls the operations of devices of the refrigerant circuit, such as the rotation speed of the compressor 11, the opening degrees of the pressure reducing devices 14a and 14b, and the switching of the refrigerant circuit switching device 12.

Further, during the first control time (30 seconds, for example) after the completion of the defrosting operation, the controller 40a sets the rotation speed of the compressor 11 to be lower than that in the defrosting operation and maintains the opening degree of the outdoor-side pressure reducing device 14a, when the opening degree of the outdoor-side pressure reducing device 14a in the defrosting operation is fully open. Further, when the opening degree of the indoor-side pressure reducing device 14b in the defrosting operation is fully open, the controller 40a maintains the opening degree of the indoor-side pressure reducing device 14b.

When the opening degrees of the pressure reducing devices 14a, 14b in the defrosting operation are not fully open, the opening degree of the outdoor-side pressure reducing device 14a is increased (to fully open, for example).

During the second control time (30 seconds, for example) equal in length to the first control time, for example, after the lapse of the first control time, the controller 40a stops the compressor 11, sets the opening degree of the outdoor-side pressure reducing device 14a to be less than that in the first control time, and maintains the opening degree of the indoor-side pressure reducing device 14b. After the lapse of the second control time, the controller 40a switches the refrigerant circuit switching device 12 to the second switching state to resume the heating operation.

A description will be given here of an operation of the air-conditioning apparatus in Embodiment 2. This air-conditioning apparatus performs the cooling operation, the heating operation, and the defrosting operation of defrosting the outdoor heat exchanger 13 as in Embodiment 1.

In the cooling operation, the controller 40a brings the refrigerant circuit switching device 12 into the first switching state and adjusts the opening degree of the outdoor-side pressure reducing device 14a so that the degree of subcooling of the refrigerant flowing out of the outdoor heat exchanger 13 reaches a target value. The controller 40a further adjusts the opening degree of the indoor-side pressure reducing device 14b so that a discharge temperature of the compressor 11 reaches a target value. Furthermore, the controller 40a performs the operations of the outdoor fan 15 and the indoor fan 22.

When the compressor 11 is driven by the controller 40a in this state, high-temperature gas refrigerant is discharged from the compressor 11. This gas refrigerant flows into the outdoor heat exchanger 13 via the refrigerant circuit switching device 12, turns into liquid refrigerant through heat exchange with outdoor air, and flows out of the outdoor heat exchanger 13. The liquid refrigerant then turns into two-phase gas-liquid refrigerant through pressure reduction sequentially performed in the outdoor-side pressure reducing device 14a and the indoor-side pressure reducing device, 14b and thereafter flows into the indoor heat exchanger 21. The two-phase gas-liquid refrigerant flowing into the indoor heat exchanger 21 evaporates through heat exchange with indoor air. In this process, the indoor air suctioned by the indoor fan 22 is cooled. Gas refrigerant evaporated in the indoor heat exchanger 21 is suctioned into the compressor 11 via the refrigerant circuit switching device 12 and the container 16. This suctioned gas refrigerant is compressed and discharged again by the compressor 11, and the refrigerant is repeatedly circulated.

In the heating operation, the controller 40a brings the refrigerant circuit switching device 12 into the second switching state and adjusts the opening degree of the indoor-side pressure reducing device 14b so that the degree of subcooling of the refrigerant flowing out of the indoor heat exchanger 21 reaches a target value. The controller 40a further adjusts the opening degree of the outdoor-side pressure reducing device 14a so that the discharge temperature of the compressor 11 reaches a target value. Furthermore, the controller 40a performs the operations of the outdoor fan 15 and the indoor fan 22.

When the compressor 11 is driven by the controller 40a in this state, high-temperature gas refrigerant is discharged from the compressor 11. This gas refrigerant flows into the indoor heat exchanger 21 via the refrigerant circuit switching device 12 and turns into liquid refrigerant through heat exchange with indoor air. In this process, the indoor air suctioned by the indoor fan 22 is heated. The liquid refrigerant turns into two-phase gas-liquid refrigerant through pressure reduction sequentially performed in the indoor-side pressure reducing device 14b and the outdoor-side pressure reducing device 14a and thereafter flows into the outdoor heat exchanger 13. The two-phase gas-liquid refrigerant flowing into the outdoor heat exchanger 13 turns into gas refrigerant through heat exchange with outdoor air and flows out of the outdoor heat exchanger 13. The gas refrigerant flowing out of the outdoor heat exchanger 13 is then suctioned into the compressor 11 via the refrigerant circuit switching device 12 and the container 16. This suctioned gas refrigerant is compressed and discharged again by the compressor 11, and the refrigerant is repeatedly circulated.

The controller 40a switches the refrigerant circuit switching device 12 from the second switching state to the first switching state during the heating operation, and controls the outdoor-side pressure reducing device 14a and the indoor-side pressure reducing device 14b in the defrosting operation so that the opening degrees of the outdoor-side pressure reducing device 14a and the indoor-side pressure reducing device 14b reach a preset opening degree for the defrosting operation (fully open, for example). Further, the controller 40 stops the operations of the outdoor fan 15 and the indoor fan 22.

When the compressor 11 is driven by the controller 40a in this state, high-temperature gas refrigerant is discharged from the compressor 11. Similarly, as in the cooling operation, this gas refrigerant flows into the outdoor heat exchanger 13 via the refrigerant circuit switching device 12 and turns into liquid refrigerant through heat exchange with frost adhering to the outdoor heat exchanger 13. In this process, the frost is heated and melted by the high-temperature gas refrigerant. The liquid refrigerant then turns into two-phase gas-liquid refrigerant through pressure reduction sequentially performed in the outdoor-side pressure reducing device 14a and the indoor-side pressure reducing device, 14b and thereafter flows into the indoor heat exchanger 21. The refrigerant flowing into the indoor heat exchanger 21 is suctioned into the compressor 11 via the refrigerant circuit switching device 12 and the container 16. This suctioned refrigerant is compressed and discharged again by the compressor 11, and the refrigerant is repeatedly circulated. This defrosting operation continues to be performed until a predetermined condition for the completion of defrosting is satisfied, as in Embodiment 1.

Figure 5:
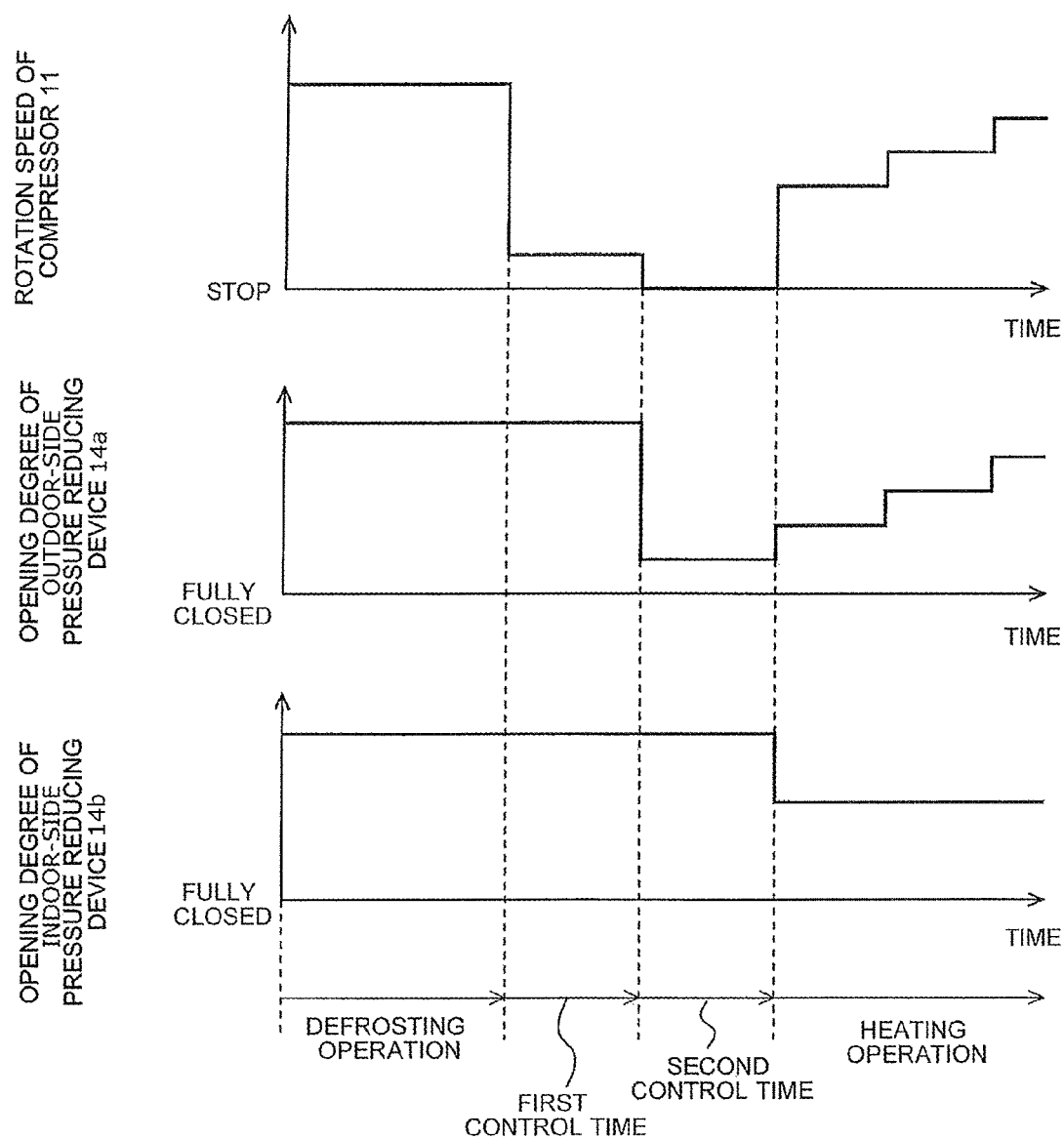
FIG. 5 is a time chart illustrating the rotation speed of the compressor and the opening degrees of pressure reducing devices after the defrosting operation in Embodiment 2 of the present invention.
Figure 6:
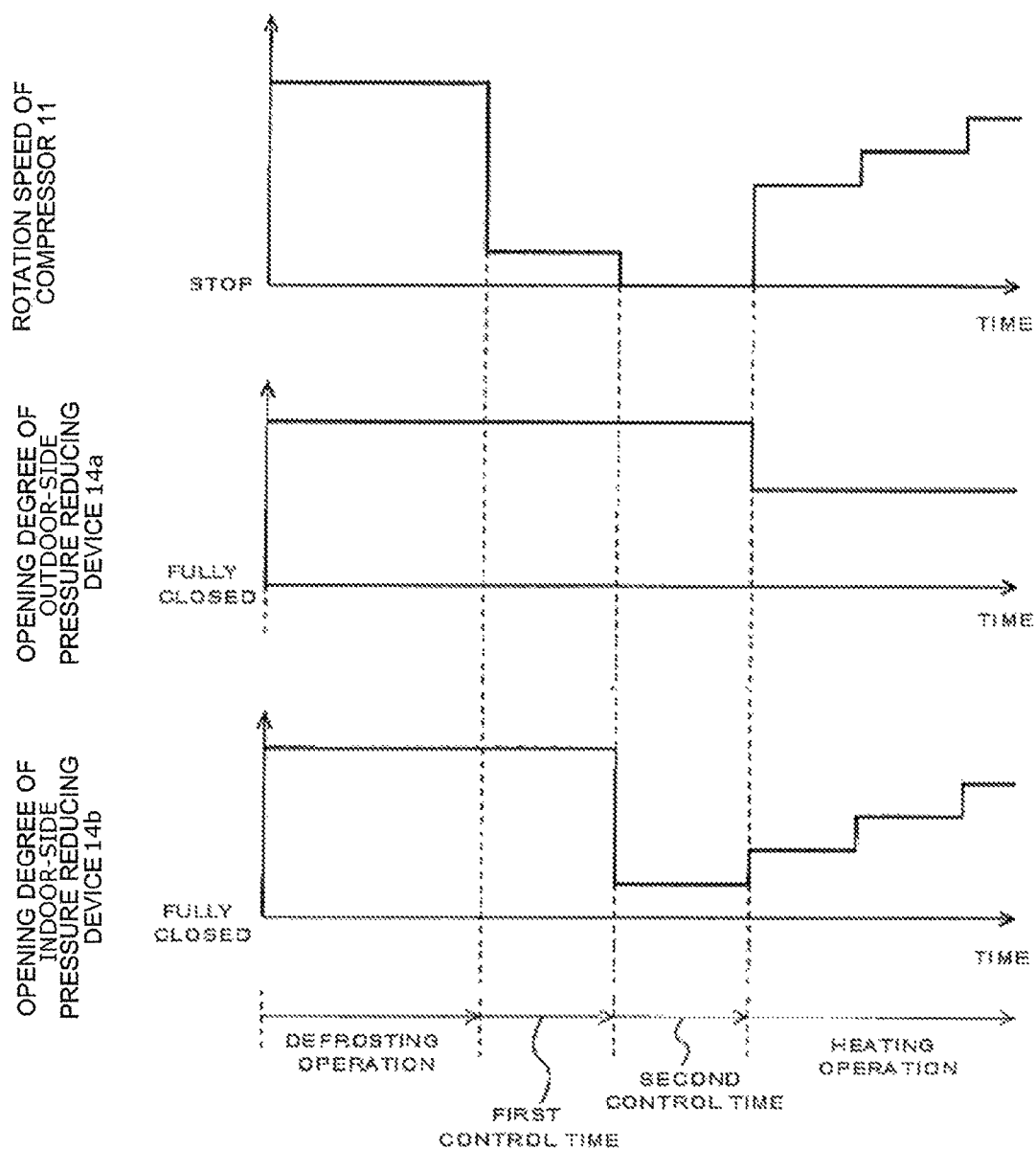
FIG. 6 is a time chart illustrating the rotation speed of the compressor and the opening degrees of pressure reducing devices after the defrosting operation in a variation of Embodiment 2 of the present invention.

An operation performed during the time from the completion of the defrosting operation to the resumption of the heating operation will be described below with FIG. 3 and FIG. 5. FIG. 5 is a time chart illustrating the rotation speed of the compressor and the opening degrees of the pressure reducing devices after the defrosting operation in Embodiment 2 of the present invention. FIG. 5 illustrates an example, which is not exhaustive.

During the first control time after the completion of the defrosting operation, the controller 40a drives the compressor 11 with the rotation speed lower than that in the defrosting operation and maintains the opening degree of the outdoor-side pressure reducing device 14a to be equal to that in the defrosting operation (fully open, for example). The controller 40a further maintains the opening degree of the indoor-side pressure reducing device 14b to be equal to that in the defrosting operation (fully open, for example). In this process, the pressure difference between the outdoor heat exchanger 13 side and the indoor heat exchanger 21 side connected to the two pressure reducing devices 14a, 14b is substantially reduced as compared with that in the defrosting operation, as in Embodiment 1 (see FIG. 3).

Then, during the second control time after the lapse of the first control time, the controller 40a stops the operation of the compressor 11 and sets the opening degree of the outdoor-side pressure reducing device 14a to be less than that in the first control time. The controller 40a further maintains the opening degree of the indoor-side pressure reducing device 14b to be equal to that in the first control time (fully open in this case). Thereby, the above-described pressure difference is further reduced and reliably eliminated at the end of the second control time, that is, at the resumption of the heating operation, as illustrated in FIG. 3.

Although the opening degrees of the pressure reducing devices 14a, 14b in the first control time are described to be maintained to be equal to those in the defrosting operation, the opening degrees of the pressure reducing devices 14a, 14b are increased (to fully open, for example) when the opening degrees of the pressure reducing devices 14a, 14b in the defrosting operation are not fully open. Further, although the length of the second control time has been set to be equal to that of the first control time, when the first control time is set to be sufficiently long (45 seconds, for example), the drop of the pressure difference in the first control time further increases, enabling the second control time to be shorter than the first control time. Also, in this case, the pressure difference can be reliably eliminated. Alternatively, the second control time may be set to be longer than the first control time. In this case, the pressure difference can be more reliably eliminated.

After the lapse of the second control time, the controller 40a switches the refrigerant circuit switching device 12 from the first switching state to the second switching state to resume the heating operation. When the controller 40a resumes the heating operation, the controller 40a starts and controls the compressor 11 to increase the rotation speed of the compressor 11 in steps and controls the outdoor-side pressure reducing device 14a to increase the opening degree of the outdoor-side pressure reducing device 14a in steps to a predetermined opening degree. The controller 40a further controls the indoor-side pressure reducing device 14b for a reduction from fully-open degree to a predetermined opening degree.

As described above, according to Embodiment 2, in the first control time during the time from the completion of the defrosting operation to the resumption of the heating operation, the opening degree of the outdoor-side pressure reducing device 14a is maintained to be equal to that in the defrosting operation or is set to be greater than that in the defrosting operation, and the opening degree of the indoor-side pressure reducing device 14b is maintained to be equal to that in the defrosting operation or is set to be greater than that in the defrosting operation, when the rotation speed of the compressor 11 is to be reduced. It is thereby possible to substantially reduce the pressure difference between the outdoor heat exchanger 13 side and the indoor heat exchanger 21 side connected to the two pressure reducing devices 14a, 14b to thus control the occurrence of the refrigerant sound.

Further, in the first control time, the opening degree of the outdoor-side pressure reducing device 14a is maintained to be equal to that in the defrosting operation or is set to be greater than that in the defrosting operation, and the opening degree of the indoor-side pressure reducing device 14b is maintained to be equal to that in the defrosting operation or is set to be greater than that in the defrosting operation, as described above. Further, in the second control time, the opening degree of the outdoor-side pressure reducing device 14a is set to be less than that in the first control time, when the compressor 11 is stopped. Thereby, the pressure difference is eliminated at the time end of the second control time, that is, at the resumption of the heating operation, and thus no excessive load is imposed on the shaft bearing of the compressor 11, leaving no possibility of malfunction of the compressor 11.

Similar effects are obtainable by switching (reversing) the operations of the pressure reducing devices 14a, 14b in the first control time and the second control time. That is, in the first control time, the opening degree of the indoor-side pressure reducing device 14b is maintained to be equal to that in the defrosting operation or is set to be greater than that in the defrosting operation, and the opening degree of the outdoor-side pressure reducing device 14a is maintained to be equal to that in the defrosting operation or is set to be greater than that in the defrosting operation. Further, in the second control time, the opening degree of the indoor-side pressure reducing device 14b is set to be less than that in the first control time when the compressor 11 is stopped. Thereby, the pressure difference is eliminated at the end of the second control time, that is, at the resumption of the heating operation, and thus no excessive load is imposed on the shaft bearing of the compressor 11, leaving no possibility of malfunction of the compressor 11.

Further, although the length of the second control time has been set to be equal to that of the first control time, when the first control time is set to be sufficiently long (45 seconds, for example), the drop of the pressure difference in the first control time further increases, enabling the second control time to be shorter than the first control time. Also, in this case, the pressure difference can be reliably eliminated. Alternatively, the second control time may be set to be longer than the first control time. In this case, the pressure difference can be more reliably eliminated.

REFERENCE SIGNS LIST 10 outdoor unit; 11 compressor; 12 refrigerant circuit switching device; 13 outdoor heat exchanger; 14 pressure reducing device; 15 outdoor fan; 16 container; 14a outdoor-side pressure reducing device (first pressure reducing device); 14b indoor-side pressure reducing device (second pressure reducing device); 20 indoor unit; 21 indoor heat exchanger; 22 indoor fan; 30a, 30b extension pipe; 40, 40a controller; (1) first connection end; (2) second connection end; (3) third connection end; (4) fourth connection end; (5) fifth connection end; (6) sixth connection end; (7) seventh connection end; (8) eighth connection end.

The invention claimed is:

1. An air-conditioning apparatus comprising:
a refrigerant circuit connecting a compressor, a refrigerant circuit switching valve, an outdoor heat exchanger, a pressure-reducing expansion valve, and an indoor heat exchanger, wherein the refrigerant circuit is configured to perform a refrigeration cycle in which refrigerant circulates; and
a controller configured to control the refrigerant circuit switching valve to cause refrigerant to flow from the compressor into the indoor heat exchanger in a heating operation and cause refrigerant to flow from the compressor into the outdoor heat exchanger in a defrosting operation of defrosting the outdoor heat exchanger,
wherein the controller is further configured to,
start the defrosting operation and control the pressure-reducing expansion valve so that an opening degree of the pressure-reducing expansion valve reaches a preset opening degree,
during a first control time and after a completion of the defrosting operation, set a rotation speed of the compressor to be lower than a rotation speed of the compressor set in the defrosting operation and set an opening degree of the pressure-reducing expansion valve to be equal to or greater than an opening degree of the pressure-reducing expansion valve set in the defrosting operation,
during a second control time and after a lapse of the first control time, stop the compressor and set the opening degree of the pressure-reducing expansion valve to be less than an opening degree of the pressure-reducing expansion valve set in the first control time, control the refrigerant circuit switching valve to perform the heating operation after a lapse of the second control time, and open the pressure-reducing expansion valve in a step-wise fashion in the heating operation after the second control time.

2. The air-conditioning apparatus of claim 1, wherein the refrigerant is R32.

3. An air-conditioning apparatus comprising:

a refrigerant circuit connecting a compressor, a refrigerant circuit switching valve, an outdoor heat exchanger, an outdoor-side pressure-reducing expansion valve, a container, an indoor-side pressure-reducing expansion valve, and an indoor heat exchanger, wherein the container and the indoor-side pressure-reducing expansion valve are between the outdoor-side pressure-reducing expansion valve and the indoor heat exchanger in the refrigerant circuit, and the refrigerant circuit is configured to perform a refrigeration cycle in which refrigerant circulates; and a controller configured to control the refrigerant circuit switching valve to cause refrigerant to flow from the compressor into the indoor heat exchanger in a heating operation and cause refrigerant to flow from the compressor into the outdoor heat exchanger in a defrosting operation of defrosting the outdoor heat exchanger, wherein the controller is further configured to, start the defrosting operation and control the outdoor-side pressure-reducing expansion valve so that an opening degree of the outdoor-side pressure-reducing expansion valve reaches a preset opening degree, during a first control time and after a completion of the defrosting operation, set a rotation speed of the compressor to be lower than a rotation speed of the compressor set in the defrosting operation and set an opening degree of the outdoor-side pressure-reducing expansion valve to be equal to or greater than an opening degree of the outdoor-side pressure-reducing expansion valve set in the defrosting operation, during a second control time and after a lapse of the first control time, stop the compressor and set the opening degree of the outdoor-side pressure-reducing expansion valve to be less than an opening degree of the outdoor-side pressure-reducing expansion valve set in the first control time, control the refrigerant circuit switching valve to perform the heating operation after a lapse of the second control time, and open the outdoor-side pressure-reducing expansion valve in a step-wise fashion in the heating operation after the second control time.

4. The air-conditioning apparatus of claim 3, wherein the refrigerant is R32.

5. The air-conditioning apparatus of claim 3, wherein the controller is further configured to, during the first control time, set an opening degree of the indoor-side pressure-reducing expansion valve to be equal to or greater than an opening degree of the indoor-side pressure-reducing expansion valve set in the defrosting operation, and during the second control time, after the lapse of the first control time, maintain the opening degree of the indoor-side pressure-reducing expansion valve set in the first control time.

6. An air-conditioning apparatus comprising:

a refrigerant circuit connecting a compressor, a refrigerant circuit switching valve, an outdoor heat exchanger, an outdoor-side pressure-reducing expansion valve, a container, an indoor-side pressure-reducing expansion valve, and an indoor heat exchanger, wherein the container and the indoor-side pressure-reducing expansion valve are between the outdoor-side pressure-reducing expansion valve and the indoor heat exchanger in the refrigerant circuit, and the refrigerant circuit is configured to perform a refrigeration cycle in which refrigerant circulates; and a controller configured to control the refrigerant circuit switching valve to cause refrigerant to flow from the compressor into the indoor heat exchanger in a heating operation and cause refrigerant to flow from the compressor into the outdoor heat exchanger in a defrosting operation of defrosting the outdoor heat exchanger, wherein the controller is further configured to, start the defrosting operation and control the indoor-side pressure-reducing expansion valve so that an opening degree of the indoor-side pressure-reducing expansion valve reaches a preset opening degree, during a first control time and after a completion of the defrosting operation, set a rotation speed of the compressor to be lower than a rotation speed of the compressor set in the defrosting operation and set an opening degree of the indoor-side pressure-reducing expansion valve to be equal to or greater than an opening degree of the indoor-side pressure-reducing expansion valve set in the defrosting operation, during a second control time and after a lapse of the first control time, stop the compressor and set the opening degree of the indoor-side pressure-reducing expansion valve to be less than an opening degree of the indoor-side pressure-reducing expansion valve set in the first control time, control the refrigerant circuit switching valve to perform the heating operation after a lapse of the second control time, and open the indoor-side pressure-reducing expansion valve in a step-wise fashion in the heating operation after the second control time.

7. The air-conditioning apparatus of claim 6, wherein the refrigerant is R32.

8. The air-conditioning apparatus of claim 7, wherein the controller is further configured to, during the first control time, set an opening degree of the outdoor-side pressure-reducing expansion valve to be equal to or greater than an opening degree of the outdoor-side pressure-reducing expansion valve set in the defrosting operation, and during the second control time, after the lapse of the first control time, maintain the opening degree of the outdoor-side pressure-reducing expansion valve set in the first control time.

* * * * *